UNITED STATES PATENT OFFICE.

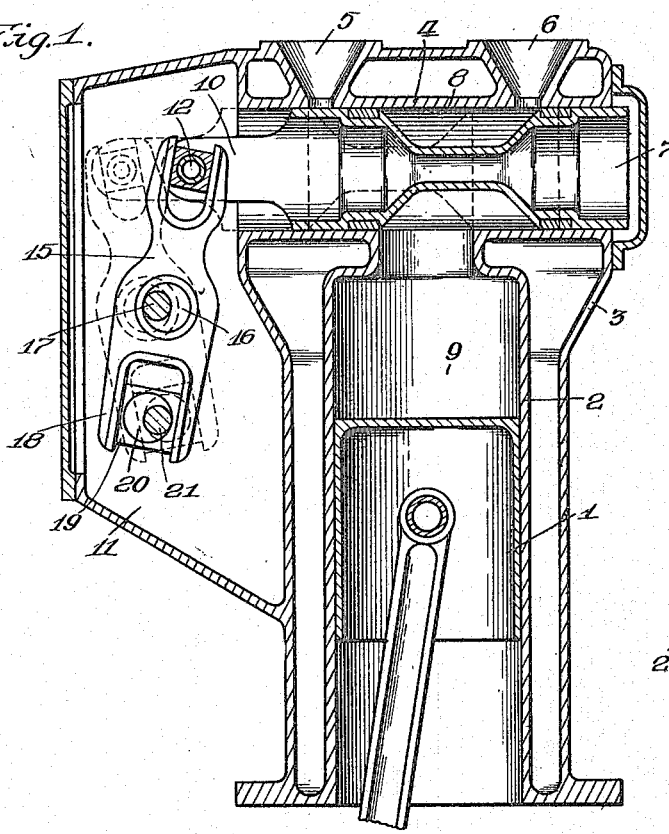

DAVID B. CHARTERS, OF PERU, INDIANA.

VALVE-OPERATING MECHANISM.

1,129,452. Specification of Letters Patent. Patented Feb. 23, 1915.

Application filed March 23, 1914. Serial No. 826,605.

*To all whom it may concern:*

Be it known that I, DAVID B. CHARTERS, citizen of the United States, residing at Peru, in the county of Miami and State of Indiana, have invented certain new and useful Improvements in Valve-Operating Mechanism; and I do hereby declare the following to be a full, clear, and exact description of the invention, such as will enable others skilled in the art to which it appertains to make and use the same.

My invention relates to valve-operating mechanisms for engines, pumps or the like and more particularly to means for actuating the reciprocating valves constituting parts of internal combustion engines.

The prime object of my invention is to provide a simple, durable, easily constructed and easily adjusted operating mechanism for transforming a rotary movement into a reciprocating movement.

Other objects will appear from the following specification and from the accompanying drawings, in which—

Figure 1 is a fragmentary section through the cylinder, water-jacket and valve chamber of a gasolene engine. Figs. 2 and 3 are fragmentary views of an end portion of a valve and of alternative forms of my mechanism for operating the same. Fig. 4 is a fragmentary section through Fig. 3 along the line 4—4. Fig. 5 is a diagrammatic view of the eccentric and rocking lever of my valve-operating mechanism, showing the method of adjusting the length of stroke.

The mechanism of my invention may be embodied with substantially equal advantages in a number of different forms, such as the three embodiments shown in the drawings. In Fig. 1, such a mechanism is shown as applied to an internal combustion engine having a hollow piston 1 reciprocating in a cylinder 2 surrounded by a water-jacket 3 and carrying at its upper end a valve chamber 4, the latter being equipped with an inlet port 5 and the outlet port 6. Slidably mounted within the said chamber 4 is a substantially dumb-bell shaped valve 7 equipped with ends slidably fitting the transverse bore 8 of the valve chamber and adapted to connect the combustion chamber 9 of the cylinder with one or the other of the said ports, according as the valve 7 is at one or the other end of its travel. To effect the reciprocation of the said valve 7, I equip the same with an end portion 10 projecting into a chamber 11 disposed laterally of the cylinder 2, and equip the said end 10 with a pin 12 extending transversely of both the cylinder and the reciprocating valve. The pin 12 carries a cross-head or bearing member 13, which latter is in slidable engagement with the forked end 14 of a rocking member 15. The said rocking member extends substantially transversely of the direction of reciprocation of the valve 7 and is equipped at or near its center with a bore affording a bearing for an eccentric 16 mounted upon a shaft 17. The other end of the said rocking member is likewise equipped with a bifurcated portion 18 affording a bearing for a cross-head 19 mounted upon an eccentric 20 carried by a second shaft 21. The shafts 17 and 21 are continuously rotated during the operation of the engine, being connected to the shaft of the engine through suitable means which need not be described or detailed, since such driving means will be familiar to those versed in internal combustion engines.

With the arrangement just described, it will be evident from Figs. 1 and 5 that the rocking member 15 is jointly carried by the two eccentrics 16 and 20, and that the disposition of the said rocking member with respect to the axis of the cylinder 2 will vary with the relative positions of the two eccentrics when the shafts carrying the latter are continuously rotated. For example, Fig. 1 shows a rocking lever and valve at one end of their normal travel, while the same figure in dotted lines shows a rocking lever and valve at the other extreme of their reciprocation. Should it be desirable to adjust the throw of the operating lever so as to vary the length of the stroke of the valve, this can readily be done by changing the relative position of the eccentrics, as shown diagrammatically in Fig. 5.

It will be evident from Fig. 1 that the rocking member of my device has a substantially pivotal connection with three other members, namely the reciprocating valve and the two shafts, and that the said rocking member is supported by one of the members with which it has its said pivotal connection. While I preferably make the pivotal connections between the said rocking member and the two shafts eccentric to the said shafts, I do not wish to be limited to this arrangement, since one of the connections might be made concentric with one of the shafts, as shown in Fig. 2. Neither do I wish to be limited to the other details of the above described construction, since the same might be varied in many ways without departing from the spirit of my invention. For example, instead of equipping the valve member with a cross-head slidably engaging a bifurcated end of the rocking member, the latter may be equipped with a stem 22 slidably engaging a trunnion 23 carried by the valve member.

I claim as my invention:

1. In an engine having a reciprocating valve, valve-operating mechanism including a pair of eccentrics rotated by the engine, and a rocking member jointly carried by the said eccentrics and connected to the said valve.

2. In an engine having a reciprocating valve, valve-operating mechanism including a pair of eccentrics rotated by the engine, and a rocking member jointly carried by the said eccentrics and disposed substantially at right angles to the direction of reciprocation of the said valve and connected to the said valve.

3. Valve mechanism including as three members an oscillatory valve and two eccentrics, in combination with a rocking lever connected to each of the said three members by a pivotal joint, and means associated with two of the said pivotal joints for permitting relative motion of the lever longitudinally thereof with respect to the members connected thereto by the said two joints.

In testimony whereof I have signed my name in presence of two subscribing witnesses.

DAVID B. CHARTERS.

Witnesses:
C. W. BEECHER,
H. C. MILLER, Jr.

Copies of this patent may be obtained for five cents each, by addressing the "Commissioner of Patents. Washington, D. C."